Aug. 20, 1935.  A. URFER  2,011,738
AIRCRAFT DEVIATION INDICATOR
Filed Dec. 19, 1931
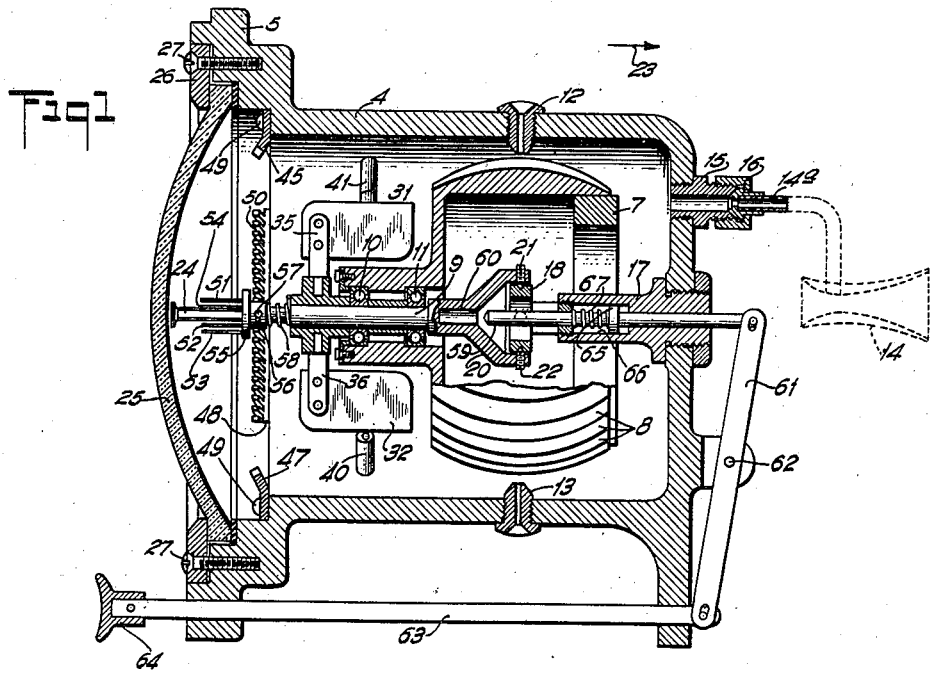
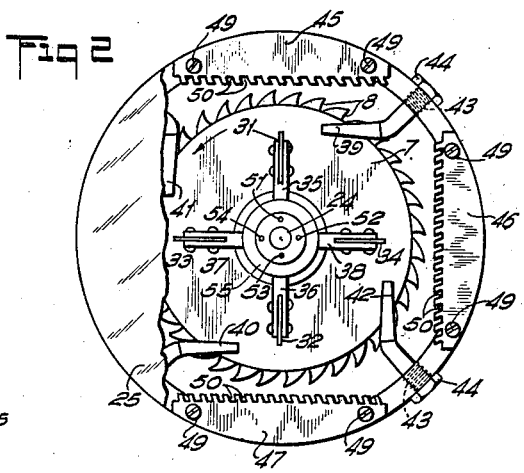
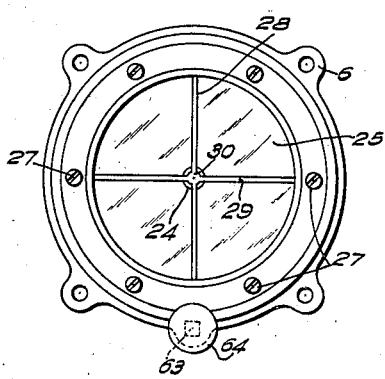
INVENTOR.
ADOLF URFER.
BY Stephen Cerstvik
ATTORNEY Patented Aug. 20, 1935

2,011,738

UNITED STATES PATENT OFFICE 2,011,738

AIRCRAFT DEVIATION INDICATOR

Adolf Urfer, Richmond Hill, N. Y., assignor to Bendix Aviation Corporation, South Bend, Ind., a corporation of Delaware Application December 19, 1931, Serial No. 582,145

16 Claims. (Cl. 33—204)

The present invention relates to indicating devices, and more particularly to an instrument for indicating the attitude of an aircraft with respect to two of its axes while the craft is in flight.

The invention embodies an indicator or pointer carried by a gyroscope having three degrees of freedom and rotated about an axis parallel to the longitudinal axis of the craft and arranged to be actuated upon movement of the craft about two of its axes at right angles to each other.

More specifically, the instrument embodying the invention is provided for the purpose of indicating the pitching and turning of an aircraft, by means of a single pointer. Such instruments are generally known in the art as deviometers. Deviometers of the prior art, however, have been found to be more or less inefficient due to the fact that they are arranged so that the pointer thereof returns to its normally centralized position rapidly and almost instantaneously after being actuated by a turn of the aircraft about one of the two axes, and consequently, with such devices the pilot may make a turn or an inclination which he would not be aware of unless he had his eyes on the instrument continuously, because the instrument may have been actuated while his attention was directed elsewhere. This rapid return of the pointer is due primarily to the fact that the gyroscopic element is universally mounted on a driving shaft; that is, the gyroscope is driven through a universal joint, such as a gimbal ring, thereby causing the gyroscopic element to become centralized immediately upon cessation of turning of the craft due to the relatively high torque existing between the element and its driving shaft. The rate of return of the pointer to normally central position is a function of the torque and is practically impossible to adjust.

Accordingly, one of the objects of the present invention is to provide a novel deviometer whereby the foregoing undesirable characteristics are eliminated.

Another object is to provide a novel deviometer including a universally supported gyroscopic element and novel means for driving said element independently of its universal support.

Another object is to provide a deviometer embodying novel driving means for the gyroscopic element thereof whereby the driving torque on the element is uniform and which is independent of the universal support of said element.

Another object is to provide in a deviometer embodying a gyroscopic element having a pointer thereon, novel centralizing means whereby the pointer may be returned to a normally centralized position at a predetermined and gradual rate.

A further object of the invention is to provide in a deviometer embodying a universally supported gyroscopic element having a pointer thereon, novel means whereby the rate of return of the pointer to its normally centralized position may be adjusted to any desired degree.

Still another object is to provide in a deviometer, a novel construction whereby the pointer remains relatively non-rotatable with respect to the gyroscopic element with which it is associated and whereby the gyroscopic element is driven independently of the pointer and of its universal support.

A still further object is to provide in a deviometer of the class described and having a pointer cooperating with a dial and arranged to be actuated within the range of the dial, novel means whereby the pointer is prevented from oscillating over the dial when it has exceeded a predetermined angular indication.

A still further object of the invention is to provide in a deviometer of the class described, novel means whereby the pointer may be centralized immediately and independently of the slowly centralizing means referred to above.

The above and other objects and advantages of the invention will appear more fully hereinafter from a consideration of the detailed description which follows, taken together with the accompanying drawing, wherein is illustrated one embodiment of the invention. It is to be expressly understood, however, that the drawing is for the purpose of illustration and description only, and is not designed as a definition of the limits of the invention, reference being had for this purpose to the appended claims.

In the drawing, wherein like reference characters refer to like parts throughout the several views, Fig. 1 is a longitudinal section of one form of instrument embodying the present invention;

Fig. 2 is a front view of the instrument with a portion of the combined dial and cover-glass removed, showing the novel means for preventing oscillation of the pointer when it has exceeded its limit of travel; and Fig. 3 is a front view showing the dial and the relation of the pointer thereto in its normally centralized position.

Referring to the drawing, and more particularly to Fig. 1, the deviometer embodying the present invention comprises an air-tight casing 4 provided with an annular flange 5 for mounting the instrument on a panel by means of the lugs or ears 6. The gyroscopic element is constituted by a rotor 7 having turbine buckets 8 and journaled on a relatively stationary shaft 9 in any suitable manner, as by means of roller bearings 10 and 11.

Means are provided for driving the rotor 7 on its shaft 9 by means of an air-stream impinging against the buckets 8 as in a steam turbine, and in the form shown comprise nozzles 12 and 13 which are secured to the wall of the casing 4 in any suitable manner, as for example by threaded engagement therewith. The air-stream through the nozzles 12 and 13 is provided by means of creating a suction within the casing in any manner desired, as by a suction pump (not shown) or by a Venturi tube 14 connected to a pipe 14a secured to the casing as by means of the coupling member 15 and the nut 16. It will be apparent that as air is withdrawn from the casing by means of the Venturi tube 14 through the pipe 14a, a supply of air will enter the casing from the exterior thereof through the nozzles 12 and 13, thereby impinging on the buckets 8 and imparting rotation to the rotor 7 on the shaft 9 through the roller bearings 10 and 11.

The shaft 9 is universally supported on a rigid tubular member 17 which may be secured to or formed integral with the casing 4. In the form shown, the universal mounting comprises a gimbal ring 18 pivoted on the member 17 on an axis passing through its center at right angles to the plane of the drawing, and pivotally connected to the gimbal ring is a funnel-shaped extension 20 of the shaft 9, as by means of the pivots 21 and 22, which coincide with an axis perpendicular to the first mentioned axis. The rotor 7 is arranged in such a manner and designed to be of such weight that, together with the shaft 9, it will have its longitudinal axis perfectly balanced on the gimbal ring 18. It will be seen that when the rotor 7 is brought up to a predetermined speed, the gyroscopic effect thereof will tend to maintain its axis stationary when the casing 4 is turned about a vertical axis or about an axis perpendicular to the plane of the drawing corresponding to a turn and a pitch, respectively, of an aircraft on which the casing is mounted, thereby producing relative angular movement between the rotor and the casing. For example, if the craft is flying in the direction of the arrow 23 and inclines upward, the relative movement of the shaft 9 on its universal support will be upward, and if the craft inclines downward, the relative movement of the shaft 9 with respect to the casing will also be downward about the horizontal axis of the gimbal ring 18. In the case of a turn of the craft to the left or right, the relative movement of the shaft 9 will also be to the left or to the right with respect to the casing.

Means are now provided for employing the relative movements of the shaft 9 with respect to the casing to produce visible indications of such movements, thereby indicating the attitude of the craft, and in the form shown comprise a pointer 24 secured to or formed integral with the shaft 9 and cooperating with a dial 25 which also forms a cover-glass for the instrument. The combined dial and cover-glass 25 may be secured to the front of the casing 4 in any suitable manner, as by means of a ring 26 and screws 27. Etched on the cover-glass 25, or marked thereon in any other suitable manner, is a vertical line 28 and a horizontal line 29 intersecting each other at 30, the intersection being the normally central position of the pointer 24, and coinciding with the longitudinal axis of the rotor 7 and the shaft 9.

Since the gyro-rotor 7 is not driven through its universal support, as pointed out hereinbefore, there will be no torque acting thereon to return it to normally central position when the axis of the rotor is changed due to a turn or pitch, and therefore, novel means are provided for causing the axis of the rotor and the shaft 9 to assume such normally central position with respect to its universal support. In the form shown, said means comprise two pairs of plates or vanes 31, 32, and 33, 34, secured to the relatively stationary shaft 9 by means of supporting members 35, 36, 37, and 38 carried by the shaft 9. Cooperating with the vanes 31, 32, 33, and 34 are jets 39, 40, 41, and 42, respectively, through which a stream of air is introduced into the casing from the exterior of the latter in the same manner as the stream which drives the rotor 7. The vanes on the jets are so arranged that when the shaft 9 is in its normally central position, the air-stream from each of the jets just clears each associated vane so that no action is produced on the vanes. However, if the pointer 24 moves upward or downward, or to the left or right, due to a change in the position of the gyroscope axis by virtue of a pitch or turn of the craft, one of the plates will move into the air-stream of its associated jet, as for example, if the pointer moves upward, the plate 31 will move into the air-stream of the jet 39. The action of the air-stream from the jet 39 on the plate 31 will tend to move the gyro axis to the left, but in so doing a precessional force is created which moves the gyro-axis, and consequently the pointer 24, downward until the plate 31 is again clear of the air-stream. If the pointer moves downward the plate 32 then is moved into the air-stream of the jet 40, tending to move the gyroscope axis to the right, thereby producing a precessional force which moves the pointer upward until the plate or vane 32 is clear of the air-stream. The same action takes place by means of the vanes 33 and 34 when the pointer moves to the left or to the right, respectively; or if a compound motion is imparted to the pointer 24 so that it is moved in two directions simultaneously, two or more of the jets will then direct a stream of air on their associated plates to produce the required precessional forces for returning the pointer to its normally centralized position. The pointer returns to its normally centralized position substantially on a straight line and will return very gradually without any oscillation of the pointer. The rate of return can be easily varied by changing the size of the jets 39, 40, 41, and 42. The latter are removable, and for this purpose are provided with threaded portions 43 and a nut 44 so that they may be screwed into the wall of the casing 4. It will be apparent, however, that the air-stream of the jets may also be varied by providing a suitable valve arrangement for each of the jets to increase or decrease the flow of air therethrough. It will be apparent from the fact that the centralizing vanes and air jets are independent of the driving means of the gyroscopic element, that no matter what the driving force is on the latter, the centralizing force can be adjusted so as to obtain any desired rate of return of the pointer. When this adjustment is made, then the rate of return of the pointer remains fixed unless readjusted again, even though the suction through the Venturi tube 14 increases, because the velocity of air will increase through the centralizing jets 39, 40, 41, and 42 as well as through the nozzles 12 and 13. Hence, the ratio of the centralizing force and the driving force will remain constant for any particular adjustment of the air jets.

From the particular arrangement of the pointer 24 with respect to the interior of the casing, it will be seen that if the pointer is moved beyond a predetermined limit, as defined by the wall of the casing, it will strike against the casing, and unless some means are provided for stopping the pointer, an undesirable oscillation thereof would be produced and accordingly, novel means are provided for eliminating such oscillations. In the form shown, said means comprise toothed racks 45, 46, 47, and 48 arranged in the form of a square and secured to the casing in any suitable manner, as by means of screws 49. Arranged to cooperate with the teeth or serrations 50 of the racks 45, 46, 47, and 48 are four pins 51, 52, 53, and 54 carried on a bushing 55 which is mounted for limited rotational movement on the shaft of the pointer 24. The limited rotational movement of the bushing 55 is determined by means of a slot 56 thereon and a pin 57 carried by the pointer shaft. A coil spring 58 is provided for counteracting the rotation of the bushing 55 and has one end connected to said bushing and the other end to the shaft 9. The teeth or serrations 50 are inclined in the direction of rotation of the rotor 7, so that when the pointer 24 is moved to its limit upward or downward, or to the left or right, the pins 51, 52, 53, and 54 will follow into one of the serrations of their associated racks 45, 46, 47, or 48. Since the pins would strike their corresponding racks with some force, they would tend to break off, but by means of the coil spring 58, such breaking is prevented, because the shock is taken up by the winding up of the spring by the limited movement of the bushing 55 through the slot and pin connection 56 and 57. By the winding action of the spring 58, a force is produced which tends to move the pin out of the serration after the aircraft has ceased turning or pitching, thereby permitting the vanes 31, 32, 33, or 34 to gradually return the pointer to its normally centralized position.

Under certain conditions, it is desirable to be able to centralize the gyro instantaneously. This is especially true in starting the device in operation and after a violent maneuver of the aircraft on which the device is mounted, during which time the position of the pointer is questionable. To this end, a novel rapidly-centralizing unit is provided to permit centralizing of the pointer from the front of the instrument independently of the action of the centralizing vanes, and, in the form shown, comprise means including the funnel-shaped extension 20 of the shaft 9 and a rod or pin 59, which is arranged to enter a cylindrical opening 60 provided in the extension 20. The rod 59 may be actuated to enter the opening 60 in any suitable manner, as by means of a bell-crank 61 pivoted at 62 and connected to an operating lever 63 which extends to the front of the instrument and is provided with a knob 64. The rod or pin 59 passes through the gimbal supporting member 17 and is provided with an enlarged portion 65 which is arranged to operate in the manner of a piston in a cylindrical chamber 66 formed in the member 17, and a spring 67 is interposed between the enlarged portion 65 and the wall of the cylinder 66 for normally maintaining the pin 59 out of the cylindrical opening 60 until such time as the pin is actuated against the spring 67 by means of the bell-crank 61 and operating lever 63.

There is thus provided a novel instrument for indicating the pitch and/or turn of an aircraft on which it is mounted whereby a prolonged indication is produced after the pointer has been actuated and the craft has ceased its turn and/or pitch, and whereby the pointer is gradually returned to its normally centralized position at any predetermined rate of return.

Novel means are also provided whereby breaking of the pointer is prevented when it has exceeded its limit of travel.

Although only one embodiment of the invention has been illustrated and described, other changes and modifications in form and relative arrangement of parts, which will now appear to those skilled in the art, may be made without departing from the scope of the invention. For example, the gyroscope rotor may be driven from the intake manifold of the engine of the aircraft as well as from a vacuum or pressure pump or from a Venturi tube. Also, the gimbal ring 18 comprising the universal mounting for the rotor may be replaced by any other suitable type of universal joint permitting angular movement of the rotor shaft in any direction. The individual serrated racks 45, 46, 47, and 48 may be replaced by a single frame, either circular or square, having serrations on its inner periphery and inclined in the direction of rotation of the gyroscopic element. Reference is therefore to be had to the appended claims for a definition of the limits of the invention.

What is claimed is:

1. A deviation indicator comprising in combination, a casing; a non-rotatable shaft having a hollow conical extension at one end and a pointer at the other end; a support for said shaft carried by the casing on the same longitudinal axis with said shaft, said shaft being normally in alignment with said support; a gimbal ring interposed between said shaft and said support and located within the conical extension of said shaft so that the latter may incline about two axes at an angle to each other in the same plane; a gyroscope rotatably mounted on said shaft and adapted to incline therewith; means for driving said gyroscope; means associated with said pointer and said casing for preventing oscillations of the pointer when the latter strikes the casing upon an excessive inclination of the shaft; means independent of the driving means for returning the pointer and shaft to normally centralized position at a predetermined rate after inclination thereof; and means for immediately returning said pointer and shaft to normally centralized position at will and independently of the first mentioned centralizing means, said rapidly centralizing means comprising a rod arranged to engage the hollow end of the non-rotatable shaft, and means operated from the front of the casing for actuating said rod into engagement with said shaft.

2. A deviation indicator comprising in combination, a casing; a non-rotatable shaft having a pointer at one end thereof; a support for said shaft carried by the casing, said shaft being normally in alignment with said support; means interposed between said shaft and said support so that said shaft can incline at an angle to the longitudinal axis of the casing; a gyroscope rotatably mounted on said shaft for maintaining the latter normally in alignment with its support; means for driving said gyroscope; means associated with said pointer and said casing for preventing oscillations of the pointer when the latter exceeds a predetermined angle of inclination; and means independent of the driving means for returning the pointer and shaft to normally centralized position at a predetermined rate after an inclination thereof.

3. A deviation indicator comprising in combination, a casing; a non-rotatable shaft having a pointer at one end thereof; a support for said shaft carried by the casing, said shaft being normally in alignment with said support; means interposed between the other end of the shaft and said support for universally mounting said shaft for movement about two axes perpendicular to each other in the same plane; a gyroscope rotatably mounted on said shaft and adapted to move therewith; means for driving said gyroscope; means associated with said pointer and said casing for preventing oscillations of the pointer when the latter exceeds a predetermined angle of inclination, said means comprising a plurality of serrations carried by the casing and pins carried by the pointer for engagement with said serrations; and means for returning said gyroscope and pointer to normally centralized position at a predetermined rate independently of the driving torque of the gyroscope.

4. A deviation indicator comprising in combination, a gyroscope universally mounted for movement about three axes perpendicular to each other; means for driving said gyroscope whereby the axis of rotation thereof tends to remain fixed in space; a fixed support for said gyroscope relative to which the rotational axis of the gyroscope is adapted to incline upon movement of the support about either or both of two of the first mentioned axes; and means separate from the driving means and unaffected thereby for returning said gyroscope to its original normally centralized position with respect to the fixed support at a predetermined and selected relatively slow rate independent of the driving torque of the gyroscope when relative movement between the gyroscope and the support about both of said two first mentioned axes has taken place.

5. A deviation indicator comprising in combination, a gyroscope universally mounted for movement about three axes at an angle to each other; fluid pressure means for driving said gyroscope whereby the axis of rotation thereof tends to remain fixed in space; a fixed support for said gyroscope relative to which the rotational axis of the gyroscope is adapted to incline upon movement of the support about either or both of two of the first mentioned axes; and fluid pressure means independent of said driving means for returning said gyroscope to its original normally centralized position with respect to the fixed support at a predetermined and selected relatively slow rate produced by a force which is maintained in a fixed predetermined ratio to the force driving the gyroscope when relative movement between the gyroscope and the support about both of said two first-mentioned axes has taken place.

6. A deviation indicator comprising in combination, a gyroscope universally mounted for movement about three axes at an angle to each other; fluid pressure means for driving said gyroscope about a horizontal axis whereby said axis tends to remain fixed in space; a fixed support for said gyroscope normally in alignment with said horizontal axis but adapted to be inclined relative thereto about either or both of two of the first mentioned axes while the third axis remains in its fixed horizontal position; and means effective upon an inclination of the fixed support for returning said gyroscope to its original normally centralized position with respect to the fixed support at a predetermined and selected relatively slow rate produced by a force which is maintained in a fixed predetermined ratio to the driving force of the gyroscope by the precessional force of the latter produced by its return movement when relative movement between the gyroscope and the support about both of said two first-mentioned axes has taken place.

7. A deviation indicator comprising in combination, a gyroscope universally mounted for movement about three axes perpendicular to each other; fluid pressure means for driving said gyroscope about one of said axes whereby the latter tends to remain fixed in space; a fixed support for said gyroscope normally in alignment with said rotational axis but adapted to be inclined relative thereto about the two remaining axes of said gyroscope; and fluid pressure means independent of said driving means for returning the rotational axis of the gyroscope into alignment with the fixed support at a predetermined rate, said means comprising a plurality of vanes radially disposed about the rotational axis of the gyroscope, and means for directing a jet of fluid onto one or more of said vanes upon relative inclination between the gyroscope and its fixed support whereby precessional forces are produced to bring said axis in alignment with the support.

8. A deviation indicator comprising in combination, a gyroscope universally mounted for movement about three axes perpendicular to each other; fluid pressure means for driving said gyroscope about one of said axes whereby the latter tends to remain fixed in space; a relatively fixed support for said gyroscope normally in alignment with said rotational axis but adapted to be inclined relative thereto about the two remaining axes of said gyroscope; and fluid pressure means independent of said driving means for returning the rotational axis of the gyroscope into alignment with the fixed support at a predetermined rate, said means comprising two pairs of vanes radially disposed about the rotational axis of the gyroscope and each pair being in a plane perpendicular to the plane of the other pair, and means associated with each of said vanes for directing a jet of fluid thereto upon relative inclination between the gyroscope and its fixed support whereby precessional forces having a fixed ratio to the driving force on the gyroscope are produced to bring the rotational axis of said gyroscope in alignment with the relatively fixed support.

9. A deviation indicator comprising in combination, a gyroscope universally mounted for movement about three axes perpendicular to each other; a non-rotatable shaft coinciding with one of said axes and upon which the gyroscope is adapted to be rotated; fluid pressure means for driving said gyroscope on said shaft whereby the latter tends to remain fixed in space; a relatively fixed support for said shaft normally in alignment with the latter but adapted to be inclined relative thereto about the two remaining axes of said gyroscope; a pointer carried by said shaft and adapted to indicate the relative inclination thereof with respect to the fixed support; and fluid pressure means independent of said driving means for returning the non-rotatable shaft into alignment with the fixed support at a predetermined rate upon a relative inclination therebetween, said means comprising two pairs of vanes carried by and radially disposed about the shaft and one pair being in a plane perpendicular to the plane of the other pair, and means associated with each of said vanes for directing a jet of fluid thereto upon relative inclination between the shaft and the fixed support whereby precessional forces having a fixed ratio to the driving force on the gyroscope are produced to bring said shaft in alignment with said support.

10. A deviation indicator comprising in combination, a gyroscope universally mounted for movement about three axes perpendicular to each other; a non-rotatable shaft coinciding with one of said axes, said gyroscope being mounted for rotation thereon; fluid pressure means for driving said gyroscope on said shaft whereby the latter tends to remain in a fixed position; a relatively fixed support for said shaft normally in alignment with the latter but adapted to be inclined relative thereto about the two remaining axes of said gyroscope; universal joint means connecting said shaft and support; means on said shaft for indicating the relative inclination between the gyroscope and the fixed support; and fluid pressure means associated with said fixed support and said non-rotatable shaft but independent of said driving means for returning the non-rotatable shaft into central position with respect to the fixed support at a predetermined rate and effective upon a relative inclination therebetween.

11. A deviation indicator comprising in combination, a casing; a non-rotatable shaft therein; a support carried by the casing; means connecting one end of the shaft to said support for universal movement; a gyroscope rotatably mounted on said shaft; an indicator operated by the shaft; and means effective upon relative movement between the shaft and its support for centralizing the gyroscope and the indicator.

12. A deviation indicator comprising in combination, a casing; a non-rotatable shaft therein; a universal support for said shaft and secured to one end thereof; a gyroscope rotatably mounted on said shaft; fluid pressure means for driving said gyroscope; an indicator operated by the gyroscope; and fluid pressure means for centralizing the gyroscope and the indicating means, said centralizing means comprising a plurality of vanes carried by and radially disposed about the non-rotatable shaft, and means for directing a jet of fluid pressure onto said vanes.

13. A deviation indicator comprising in combination, a casing; a non-rotatable shaft therein; a universal support secured to the casing and carrying one end of the shaft; a gyroscope rotatably mounted on said shaft; a pointer carried by said shaft and adapted for inclination therewith relative to the casing; air operated means associated with the casing and the shaft for centralizing the gyroscope and the pointer; and means carried by the casing and cooperating with the pointer for preventing oscillations of said pointer when the latter strikes the casing upon an excessive inclination thereof.

14. A deviation indicator comprising in combination, a casing; a non-rotatable shaft therein; a universal support secured to the casing and carrying one end of the shaft; a gyroscope rotatably mounted on said shaft; a pointer carried by said shaft and adapted for inclination therewith relative to the casing; air operated means associated with the casing and the shaft for centralizing the gyroscope and the pointer; and means carried by the casing and cooperating with the pointer for preventing oscillations of said pointer when the latter strikes the casing upon an excessive inclination thereof, said means comprising means carried by the casing and having serrations therein, and a plurality of pins carried by the pointer and adapted to engage the serrations when the pointer strikes the wall of the casing.

15. A deviation indicator comprising in combination, a casing; a non-rotatable shaft therein; a universal support secured to the casing and carrying one end of the shaft; a gyroscope rotatably mounted on said shaft; a pointer carried by the other end of said shaft and adapted for inclination therewith relative to the casing; means associated with the casing and the shaft for centralizing the gyroscope and the pointer; and means carried by the casing and cooperating with the pointer for preventing oscillations of said pointer when the latter strikes the casing upon exceeding a predetermined angle of inclination, said means comprising means carried by the casing and having serrations therein, a plurality of pins carried by the pointer and adapted to engage the serrations when the pointer strikes the wall of the casing, and resilient means interposed between the pointer and the pins for taking up the impact of the pointer against the casing and for withdrawing the pins from said serrations.

16. A gyroscopic device comprising in combination, a non-rotatable shaft; a support for said shaft; means connecting one end of the shaft to said support for universal movement; a gyroscope rotatably mounted on said shaft; and means effective upon relative movement between the shaft and gyro and its support for automatically centralizing the gyroscope with respect to said support.

ADOLF URFER.